United States Patent [19]
Cates

[11] Patent Number: 6,101,821
[45] Date of Patent: Aug. 15, 2000

[54] ICE THERMAL STORAGE COIL SYSTEMS AND METHODS

[75] Inventor: Robert E. Cates, Kingwood, Tex.

[73] Assignee: Evapco International, Inc., Wilmington, Del.

[21] Appl. No.: 09/316,404

[22] Filed: May 21, 1999

Related U.S. Application Data

[60] Provisional application No. 60/086,490, May 22, 1998.

[51] Int. Cl.$^7$ ...................................................... F25D 3/00
[52] U.S. Cl. .................................................. 62/139; 62/59
[58] Field of Search ................................ 62/59, 515, 139; 165/150, 151, 163

[56] References Cited

U.S. PATENT DOCUMENTS

| | | | |
|---|---|---|---|
| 2,056,970 | 10/1936 | Leopold | 62/139 |
| 3,197,975 | 8/1965 | Boling | 62/515 |
| 3,484,805 | 12/1969 | Lorenz | 62/139 |
| 4,192,146 | 3/1980 | Crede | 62/59 |
| 4,294,078 | 10/1981 | MacCracken . | |
| 4,403,645 | 9/1983 | MacCracken . | |
| 4,609,036 | 9/1986 | Schrader . | |
| 4,616,390 | 10/1986 | MacCracken . | |
| 4,671,347 | 6/1987 | MacCracken . | |
| 4,831,831 | 5/1989 | Carter et al. . | |
| 5,425,414 | 6/1995 | Bradley, Jr. et al. . | |
| 5,596,877 | 1/1997 | Morrison . | |
| 5,598,720 | 2/1997 | MacCracken et al. . | |
| 5,649,431 | 7/1997 | Schroeder, Jr. . | |

OTHER PUBLICATIONS

Evapco, Inc. Brochure entitled "Ice–Pak Coils (Quality Coils Designed for Ice Storage Systems)," Bulletin 401B, pp. 1–12 (1988).
Continental Equipment Corp. Brochure entitled "Latent Heat Storage Units or Ice Builders," B39 Catalog, Cover page and 5 pages (1982).
Sullair, Concept Brochure entitled "HVAC & ICE," Cover page and 9 pages (1990).
Baltimore Aircoil Company Bulletin S150/1–OBA, entitled "Ice Chiller® Thermal Storage Products for Use with Glycol Chillers," Cover Sheet and 24 pages, (Jan. 1995).
Baltimore Aircoil Company Bulletin S155/1–OBA, entitled "Ice Chiller Thermal Storage Units," Cover Sheet and 7 pages (1997).
Calmac Manufacturing Corporation Bulletin entitled "An Introduction to Ice Bank Sotred Cooling Systems for Commercial Air Conditioning Applications," W.G. Dockendorf, Inc. , Ed., 6 pages (1982).
York International Corporation, Applied Systems, Brochure entitled "York® ICEPAK™ SC—Self Contained Thermal Storage System," Form 175.00–EG1, Cover Sheet and pp. 10–14 (1988).
FAFCO, Inc. Brochure P/N 06438 entitled "IceStor™— Advanced Technology Cool Storage Systems," Cover Sheet and 6 pages (1997).
Perma–Pipe Brochure entitled "On the Job with Perma–Ice™," vol. 2, #1, 4 pages, (1985).

(List continued on next page.)

*Primary Examiner*—William E. Tapolcai
*Attorney, Agent, or Firm*—Akin, Gump, Strauss, Hauer & Feld, L.L.P.

[57] ABSTRACT

The present invention is directed toward an ice-on-coil (IOC) thermal storage coil system and method utilizing "deep-tank" technology and dimensional relationship of coil height to coil width wherein the coil serpentine's height (vertical tube dimension) is greater than the width (the horizontal dimension), and wherein all manifold and header joints are above, or just below the water surface of the tank, easily visible and accessible for maintenance, assembly, leak-checking or repair. Another aspect of the present ice-on-coil (IOC) thermal storage coil system and method is that, in some embodiments, the ice-coil tubes are never horizontal anywhere in the full coil height, but instead vertical tubes or "near-horizontal" sloped tubes are utilized which slope in an upward direction to facilitate air removal during filling of the coil with the coolant mixture.

27 Claims, 14 Drawing Sheets

OTHER PUBLICATIONS

Perma–Pipe Brochure entitled "Bundles of Ice That Save You Bundles of Money," 3 pages (1987).

Chester–Jensen Company Catalog entitled "Air Agitated Ice Builders," Catalog Section M, Cover Sheet, pp. M1–M7 & 1 additional page (1983).

IMECO Inc. advertisement, p. 17, *Ashrae Journal* (May 1985).

Chester–Jensen Company Incorporated, Drawing No. C–J Dec. 9, 1983 for XM–16–12–100 Ice Builder.

Baltimore Aircoil Co. Brochure entitled "Ice Chiller Thermal Storage Units—Featuring A High Efficiency Coil Design for Lower System Operating Cost," Cover Sheet and pp. 2, 3, 9, 10 & 11 (1985).

Baltimore Aircoil Co. Brochure #S156/1–OCA, entitled "Ice Chiller Thermal Storage Unit—Application Guide", Cover Sheet and p. 6 (unknown).

Brady, Thomas W., "Thermal Storage for the Merchandise Mart," *Ashrae Journal*, 5 pages (Nov. 1986).

"The Role of Stainless Steel in Industrial Heat Exchangers," Brochure of Committee of Stainless Steel Producers, American Iron and Steel Institute, Washington, DC 20036, Cover Sheet and 4 pages (Apr. 1976).

Kern, Donald Q., "Process Heat Transfer," McGraw–Hill Book Company, Cover Sheet and p. 135 (1950).

J. Gregory Reardon, P.E. and Kenneth M. Penuel, *Thermal Storage* —An ice–making showcase," *Ashrae Journal*, Cover Sheet and 6 pages (May 1985).

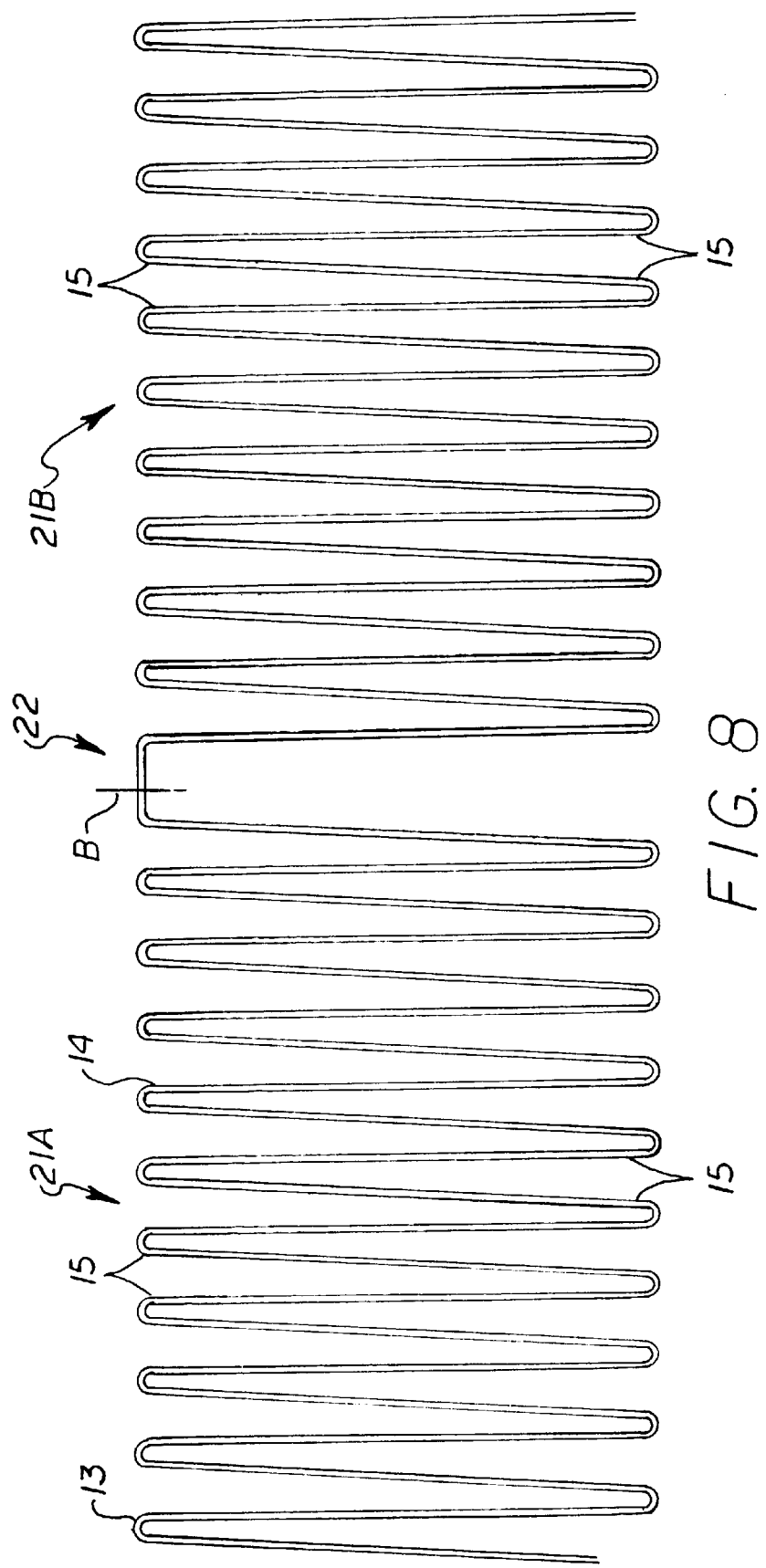

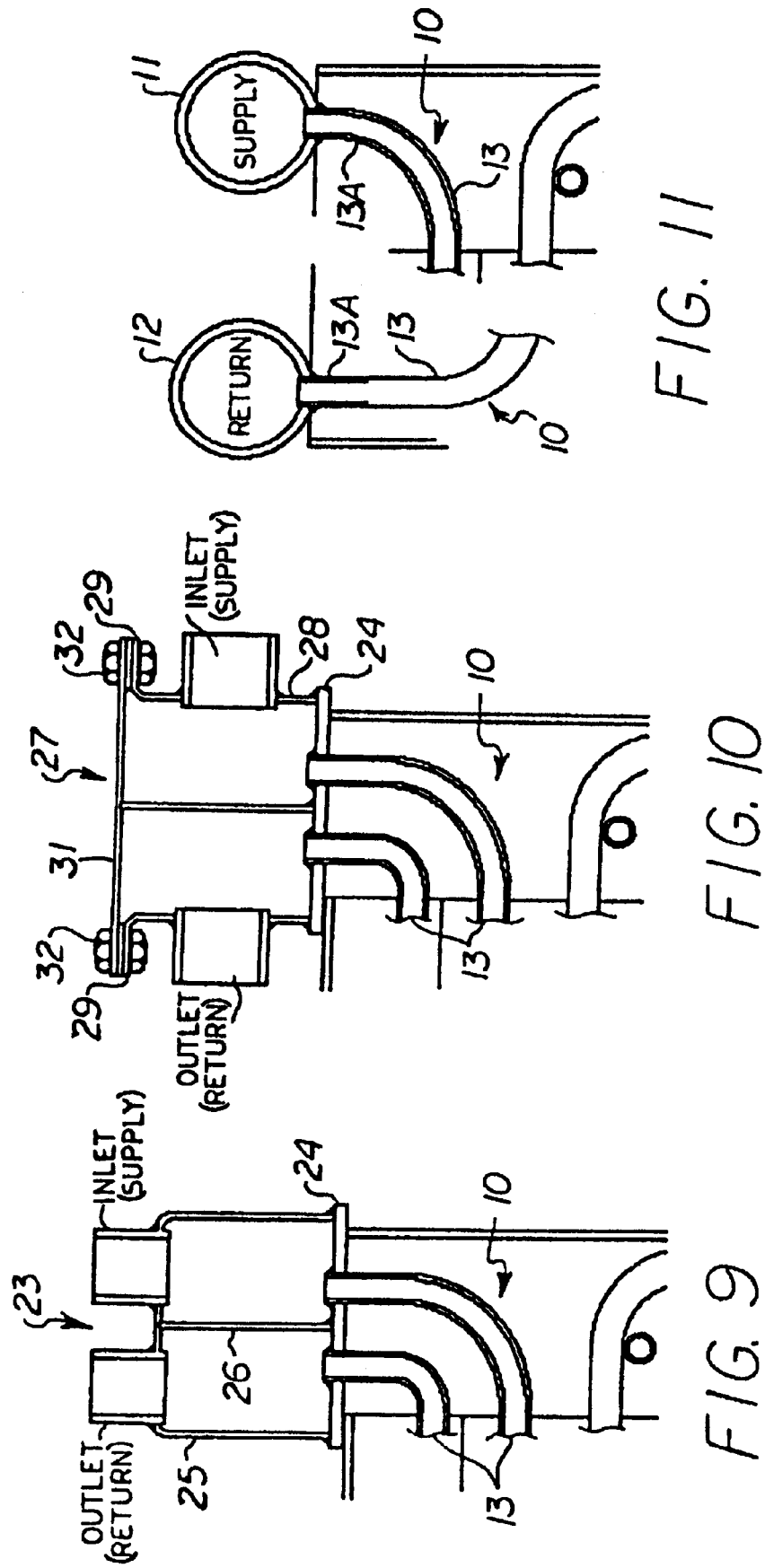

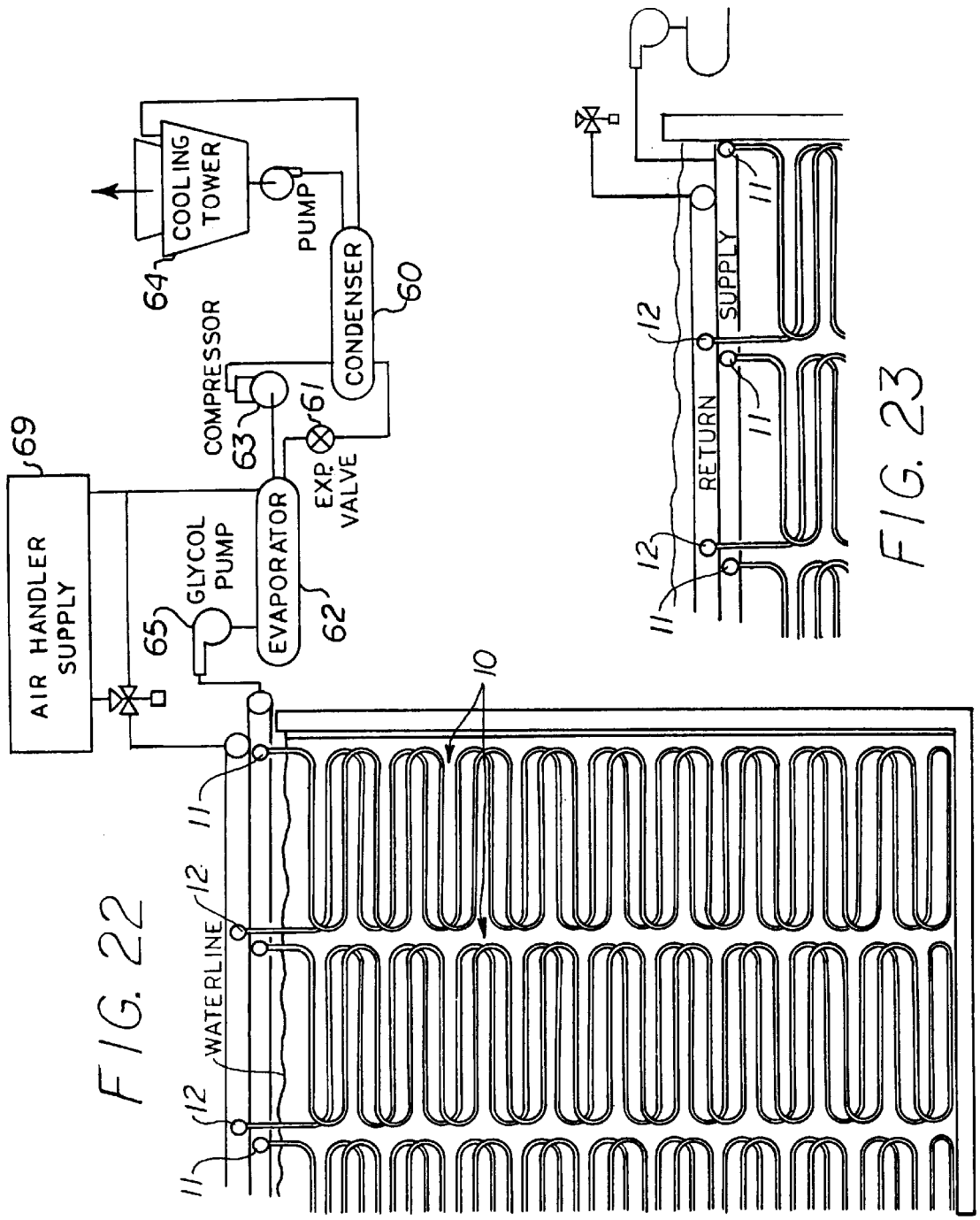

ICE THERMAL STORAGE COIL SYSTEMS AND METHODS

CROSS REFERENCE TO RELATED APPLICATION

This application claims priority of U.S. Provisional Application Ser. No. 60/086,490, filed May 22, 1998.

BACKGROUND OF THE INVENTION

1. Field of the Invention

This invention relates generally to apparatus and methods that utilize an "ice-on-coil" (IOC) thermal storage technique, as opposed to other methods of thermal storage, and more particularly to ice thermal storage coil systems and methods for use in "ice-on-coil" (IOC) installations.

2. Brief Description of the Prior Art

Current "ice-on-coil" (IOC) thermal storage methods use either coils formed of plastic tubes or galvanized steel tubes in bundled modules. Major suppliers of IOC thermal storage systems include: Baltimore Aircoil Co. of Jessup, Md., Evapco, Inc. of Westminster, Md. (steel tubes), Calmac Manufacturing Corp. of Englewood, N.J., and Fafco, Inc. of Redwood City, Calif. (plastic tubes). The art of each involves methods of circuiting the coil modules to best achieve even ice-build and melt processes, and to best manage the air removal during glycol-filling and draining processes. However, each has major draw-backs which are difficult to manage economically when projected to the larger capacity systems where many modules are connected in parallel or installed in deep tanks where it is desired to minimize the floor space used for the water-filled storage tanks which contain the coil modules. These state-of-the-art systems require massive welded piping and manifolds below the waterline of the ice storage tanks to facilitate piping connections to each module of the stacked module groupings and to achieve the reverse-piping arrangements to successfully remove air during filling with the glycol-water refrigerant inside the coil tubes.

FIG. 1 is an example of a typical serpentine "ice-on-coil" system of the current state-of-the-art, or prior art. As shown in FIG. 1, the serpentine coil modules are at least 2 times as wide as they are high. In the real applications of these prior art coils, the serpentines are typically up to 7' high by 21' wide per module. Some are even less than 7' high by 21' wide, and in the case of smaller prior art coil modules, the units are typically 4' high by 12' wide.

The prior art typically uses a stack of two to six deep coil modules, and presents many problems during construction to actually provide a space sufficient to complete the piping installation with suitable access space for welders down deep in the tank between the coil modules. This welding access and lost piping space also requires the tank to be larger than required. The present invention eliminates the major problem of tight working spaces for welding the manifold connections and piping in the deep tanks and allows use of a smaller tank for the same total thermal storage capacity requirement.

Prior art steel tubes used for the coils are typically welded on-line as they are manufactured by roll-forming from thin strips of sheet steel. These tubes are then formed to about 180 degree U-bends as they make up a serpentine, then the serpentines are stacked in a spaced frame to form a complete coil module and are further welded at the tube ends to a drilled or punched header plate. The header plates are then enclosed by a welded channel to form a closed manifold for the inlet or outlet connections of the coil module. The coil tubes are more likely to leak at the field piping or header joints than any other area, even after galvanizing. The present invention provides an accessible tube option to isolate as few as two tubes at the top, without losing any significant ice-making capacity, should a leak occur in a tube circuit.

The present invention is distinguished over the prior art in general, by an ice-on-coil (IOC) thermal storage coil system and method utilizing "deep-tank" technology and dimensional relationship of coil height to coil width wherein the coil serpentine's height (vertical tube dimension) is greater than the width (the horizontal dimension), and wherein all manifold and header joints are above, or just below the water surface of the tank, easily visible and accessible for maintenance, assembly, leak-checking or repair. Another aspect of the present ice-on-coil (IOC) thermal storage coil system and method is that, in some embodiments, the ice-coil tubes are never horizontal anywhere in the full coil height, but instead vertical tubes or "near-horizontal" sloped tubes are utilized which slope in an upward direction to facilitate air removal during filling of the coil with the coolant mixture.

SUMMARY OF THE INVENTION

It is therefore an object of the present invention to provide an ice-on-coil (IOC) thermal storage coil system and method which may be used on any large or small air conditioning or process cooling system where the very smallest floor-space requirement is a necessity, it may be best used where current ice coils are stacked-up in deeper tanks, such as installations used for larger office building air conditioning systems that use thermal storage, or for "District Cooling" thermal storage systems or other large buildings requiring air conditioning with ice thermal storage.

It is another object of this invention to provide an ice-on-coil (IOC) thermal storage coil system and method utilizing "deep-tank" technology and dimensional relationship of coil height to coil width wherein the coil serpentine's height (vertical dimension) is greater than the width (horizontal dimension), and in some installations at least twice as high as the tube circuit width between the U-bends.

Another object of this invention is to provide an ice-on-coil (IOC) thermal storage coil system and method utilizing "deep-tank" technology and dimensional relationship of coil height to coil width wherein the coil serpentine module height and width are designed to be accommodated in conventional galvanizing tanks and on the beds of shipping trucks of standard dimensional size.

Another object of this invention is to provide an ice-on-coil (IOC) thermal storage coil system and method which may be utilized in larger systems, such as "District Cooling" IOC plants, wherein a special downtown icemaking plant is established, in cooperation with the local utility, and the plant provides ice water or glycol through underground piping to the individual buildings of a sector of the city to provide the necessary air conditioning, thereby eliminating the need for the building to provide air conditioning compressors, condensers, and cooling towers, etc.

Another object of this invention is to provide an ice-on-coil (IOC) thermal storage coil system and method which may be utilized in "District Cooling" IOC plants, which will allow a given building to remove obsolete equipment which otherwise might require expensive re-building to achieve the required up-grading to meet CFC environmental regulations, and permits more energy efficient concepts which shift load off the utility in peak-load periods to allow use of generated electric power at night when least expensive to build ice for melting during the next day's peak periods.

Another object of this invention is to provide an ice-on-coil (IOC) thermal storage coil system and method which may be utilized in "District Cooling" IOC plants, which will allow a building owner to restore the floor space previously used for mechanical equipment to productive use, such as a retail or office space.

Another object of this invention is to provide an ice-on-coil (IOC) thermal storage coil system and method which may be utilized in high, round or rectangular tanks and in smaller installations where only a very small floor-space is available, such as in corners of alley-ways of high-rise buildings, or where only a portion of a building might be available for thermal storage, such as a night club or restaurant which may need special cooling provided to augment an old air conditioning system.

Another object of this invention is to provide an ice-on-coil (IOC) thermal storage coil system and method wherein all manifold and header joints are above, or just below the water surface of the tank, easily visible and accessible for maintenance, assembly, leak-checking or repair, and wherein mainly the tubes are submerged for ice-building purposes.

Another object of this invention is to provide an ice-on-coil (IOC) thermal storage coil system and method which has an accessible tube option that allows as few as two tubes at the top to be isolated without losing any significant ice-making capacity, should a leak occur in a tube circuit.

Another object of this invention is to provide an ice-on-coil (IOC) thermal storage coil system and method wherein the ice-coil tubes are never horizontal anywhere in the full coil height, but instead utilizes vertical tubes or "near-horizontal" tubes which slope in an upward direction to facilitate air removal during filling of the coil with glycol-water.

Another object of this invention is to provide an ice-on-coil (IOC) thermal storage coil system and method which eliminates the problem of tight working spaces in deep-tank installations required for welding manifold connections and piping and does not require large access space for such operations and thereby allows use of a smaller tank for the same total thermal storage capacity requirement of a conventional IOC system.

A further object of this invention is to provide an ice-on-coil (IOC) thermal storage coil system that provides alternate usage of mechanical field piping connections and eliminates field welding of manifolds.

A still further object of this invention is to provide an ice-on-coil (IOC) thermal storage coil system and method utilizing coils which may be manufactured economically utilizing modern bending machinery, automated benders, and indexing machines, even though there may be as much as 4 or 5 times as many U-bends compared to conventional coil designs.

Other objects of the invention will become apparent from time to time throughout the specification and claims as hereinafter related.

The above noted objects and other objects of the invention are accomplished by an ice-on-coil (IOC) thermal storage coil system and method utilizing "deep-tank" technology and dimensional relationship of coil height to coil width wherein the coil serpentine's height (vertical tube dimension) is greater than the width (the horizontal dimension), and wherein all manifold and header joints are above, or just below the water surface of the tank, easily visible and accessible for maintenance, assembly, leak-checking or repair. Another aspect of the present ice-on-coil (IOC) thermal storage coil system and method is that, in some embodiments, the ice-coil tubes are never horizontal anywhere in the full coil height, but instead vertical tubes or "near-horizontal" sloped tubes are utilized which slope in an upward direction to facilitate air removal during filling of the coil with the coolant mixture.

BRIEF DESCRIPTION OF THE DRAWINGS

FIG. 8 is a schematic illustration of a tube-bending layout pattern to nearly approximate the transition bend and effect the coil configurations of FIGS. 2 through 5 utilizing a compound 3-dimensional bend to position the adjacent row of serpentines.

FIG. 9 is a cross section of a first alternate embodiment of an inlet and outlet "box" header having a partition arranged to permit all piping manifolds in the field to be on one side at the top of the coil module.

FIG. 10 is a cross section of a second alternate embodiment of a partitioned inlet and outlet "box" header with a removable cover plate for accessing each tube inlet or outlet for future servicing or blocking in the event of a tube leak at the lower tube extremities.

FIG. 11 is a cross section of a third alternate embodiment of an inlet and outlet header with up-bends below the header to permit operation without submerging the header and avoid liquid traps.

FIG. 22 is a schematic side elevation of a portion of a multi-modular tall non-stack deep-tank ice-coil serpentine system illustrating a piping system that allows the system to be used for ice melting or ice-building during various periods of the day or week to allow minimizing use of electric power during periods of heavy power demand.

FIG. 23 is a schematic side elevation of a portion of the systems of FIGS. 21 and 22 showing an alternate arrangement with the supply and return headers submerged below the waterline.

DESCRIPTION OF THE PREFERRED EMBODIMENTS

Figure 1:
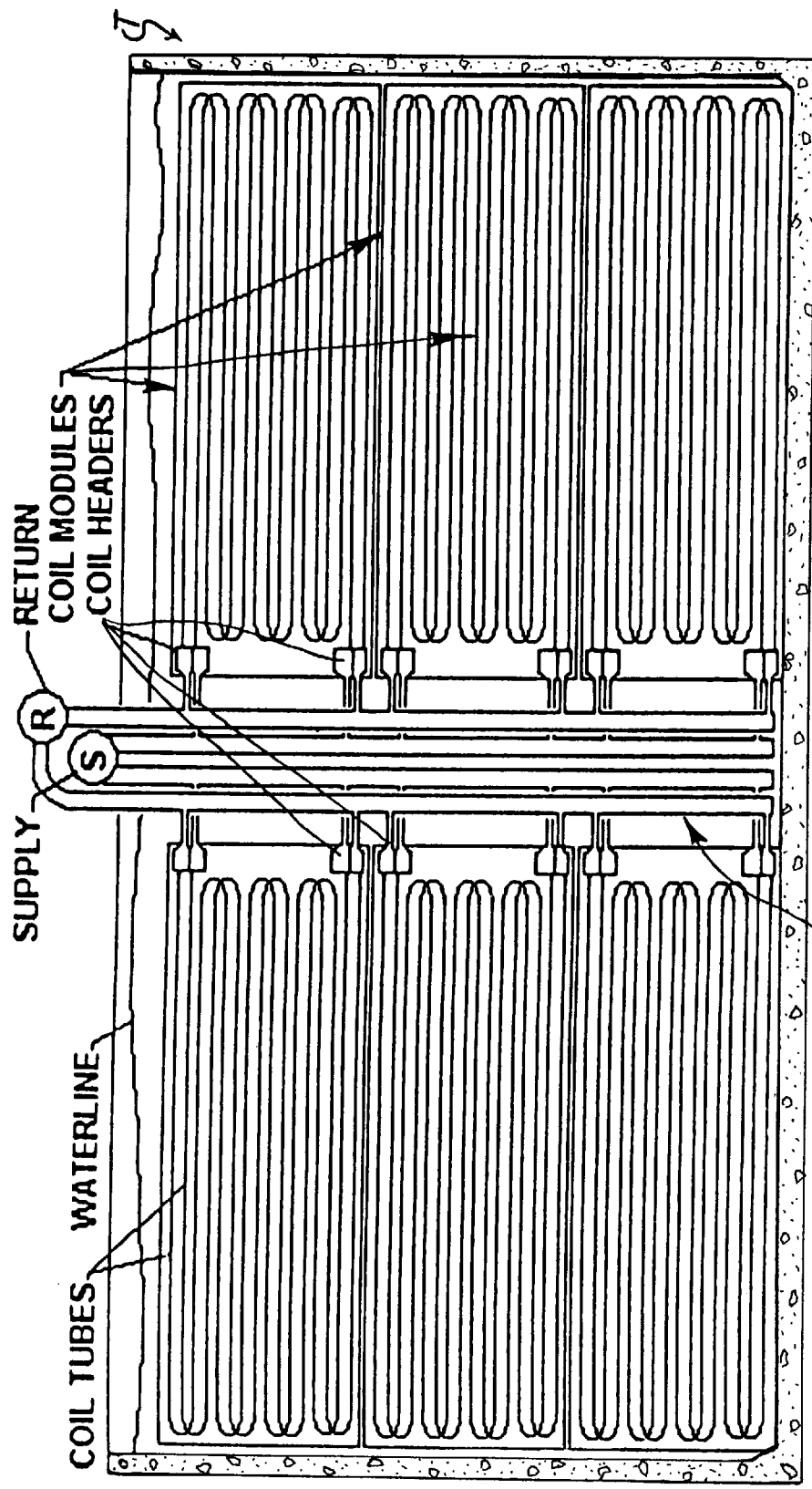
FIG. 1 is a schematic cross sectional view of a typical deep-tank stacked module ice-coil serpentine arrangement of the prior art.

Referring to the drawings by numerals of reference, FIG. 1 shows, schematically, an example of a typical deep-tank stacked module "ice-on-coil" (IOC) serpentine arrangement of the prior art, having stacked coils and field-welded manifolds in the narrow space between the coil modules and requiring many field-welded joints of both the headers and the manifold piping in the lower depths of the tank in nearly inaccessible places, and also illustrating the large manifold piping space which cannot be effectively used for ice-storage.

The prior art serpentines are at least 2 times as wide as they are high. In the real applications of these prior art coils, the serpentines are typically up to 7' high by 21' wide per module. Some are even less than 7' high by 21' wide, and in the case of smaller prior art coil modules, the units are typically 4' high by 12' wide. The prior art system typically uses a stack of two to six deep coil modules. The illustrated example shows parallel-piped manifold arrangements of two stacks of coil modules each three modules in height with each module about 5' wide, 7' in height and 22' in length, but typical cases can be as many as 5 to 10 modules of height and multiple units in the depth direction for the largest district cooling projects.

The coils are typically contained in a concrete tank T which is filled with water. As cold coolant mixtures (ethylene glycol/water mixtures) are circulated through the coils, the water in the tank freezes and forms ice cylinders on the coil tubes. There are two choices of operation: (a) either pump the ice water to the load heat exchangers, or (b) keep all the water in the tank and pump the coolant in the coils to the load.

The prior art system requires a clearance space between the coils and the side walls of the tank T of sufficient size to complete the piping installation with suitable access space between the coil modules for welding and servicing. This lost piping space cannot be effectively used for ice-storage and also requires the tank to be larger than necessary. The prior art system also requires field-welded manifolds in the narrow space between the coil modules and requires many welded joints of both the headers and the manifold piping in the lower depths of the tank in nearly inaccessible places. The stacks of coils must be welded to manifolds before being placed in the tank which requires a very heavy crane lift or, alternatively, extra space must be allotted between coils for welder access during installation.

The steel tubes used for the prior art coils are typically welded on-line as they are manufactured by roll-forming from thin strips of sheet steel. These tubes are then formed to about 180 degree U-bends as they make up a serpentine, then the serpentines are stacked in a spaced frame to form a complete coil module and are further welded at the tube ends to a drilled or punched header plate. The header plates are then enclosed by a welded channel to form a closed manifold for the inlet or outlet connections of the coil module. Due to cramped welding space, the tubes are more likely to leak at the field-welded connections than any other area, and they are not galvanized for corrosion protection. In the prior art system, the manifolds and headers are all underwater, also occupying useful ice storage space.

The welded joints of the piping and headers are difficult to access for repair, installation or inspection, should a glycol leak occur. Glycol leaks will contaminate the entire water tank, causing an undesirable depression of the ice freeze temperature, leading ultimately to the inability to freeze any ice at all and thereby not achieving any significant latent heat of fusion of ice storage.

Figure 2:
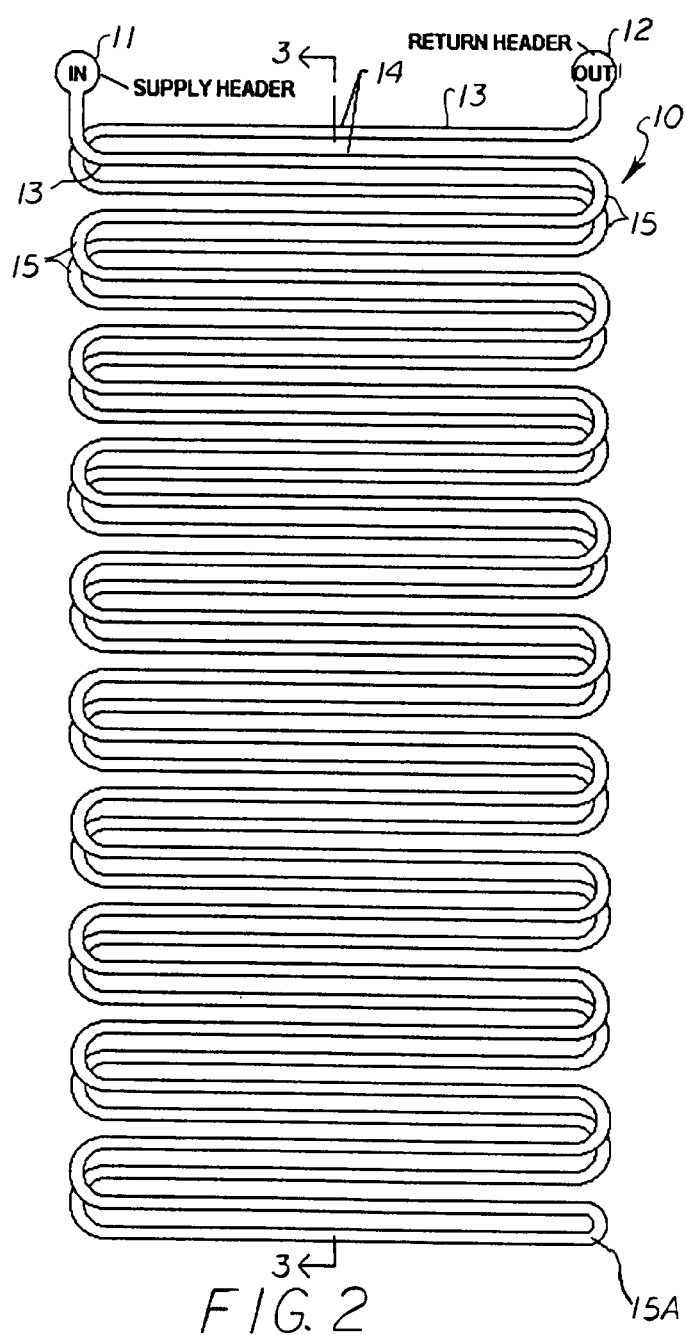
FIG. 2 is a schematic side elevation of a typical tall non-stack deep-tank ice-coil serpentine module in accordance with the present invention, shown with the ice cylinders and framing details omitted.
Figure 3:
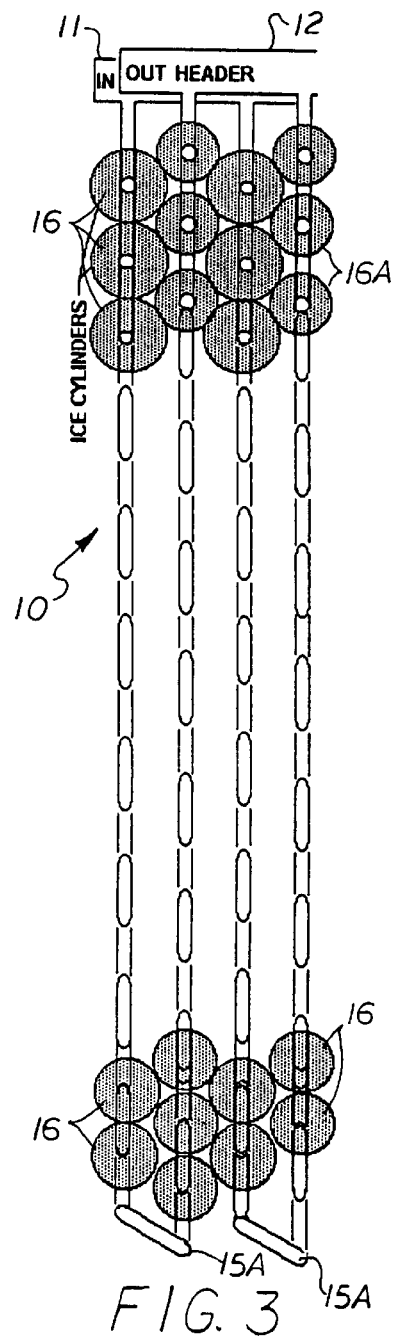
FIG. 3 is a schematic cross section taken along line 3—3 of FIG. 2, showing how adjacent ice cylinders are nested in a pattern of least void space, when placed in the tank and water is frozen on the tubes.

Referring now to FIGS. 2 through 5, there is shown, somewhat schematically, a typical tall non-stack deep-tank ice-coil serpentine module 10 in accordance with the present invention, which eliminates the need to stack multiple coils. It should be noted that the supply headers 11 and return headers 12 are disposed at the top of the module, easily accessible for final welding of manifolds, or alternate mechanical joints of piping, all of which is done above the water line of the ice tank. In FIGS. 2 and 3, the ice tank into which the coil modules are placed is not shown and the framing details, which are conventional in the art, are not shown.

Each coil 10 is formed of tubes 13 bent into a generally S-shaped serpentine of vertically spaced rows of straight run sections 14, which may be horizontal or slightly sloped from horizontal, with U-shaped bends 15 at each end of the run. The inlet ends of the coil tubes 13 are connected to the supply headers 11 and their outlet ends are connected to the return headers 12. A series of the serpentines extend downwardly from the supply header 11 and form the "supply side" of the coil and a second series of the serpentines extend upwardly from the lowermost U-shaped bend 15A of the supply side to the return header 12 to form the "return side" second row of the coil. Typically, many of these two-row serpentines are placed alongside each other to form a complete module. The "supply side" and "return side" are disposed in generally parallel spaced apart vertical planes. As shown in FIG. 3, the lowermost U-bend in the transition from the down-serpentines and the up-serpentines is a compound U-bend 15A which is formed into the serpentine-pair in order to return all glycol from a down-serpentine through an up-serpentine to the outlet header. The compound U-bend 15A curves about a horizontal axis while sloping at an angle with respect to a vertical axis. The compound bend may be accomplished by bending the tube, as shown, or a welded U-turn fitting.

Figure 4:
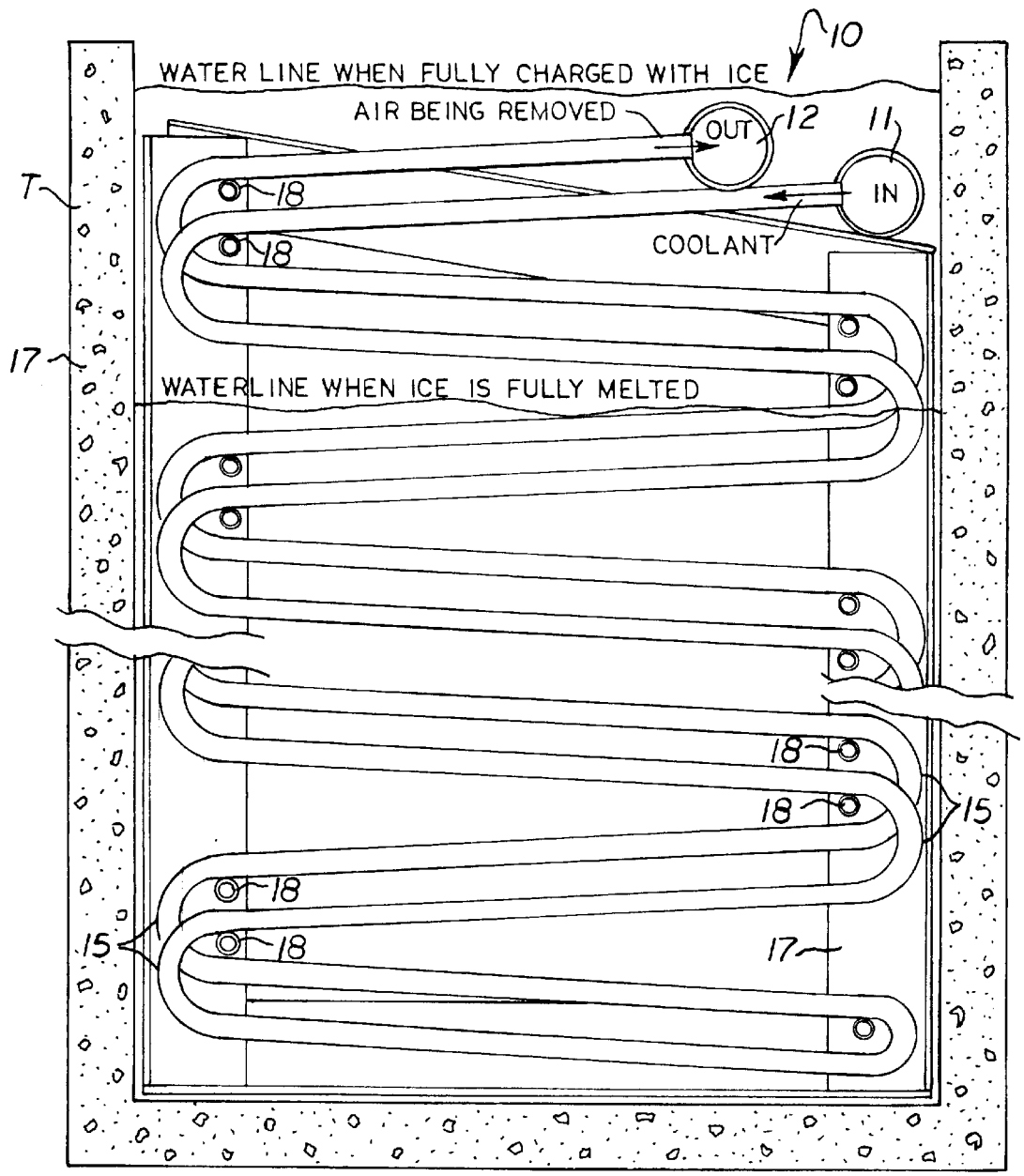
FIG. 4 is a schematic side elevation of the tall non-stack deep-tank ice-coil serpentine module in accordance with the present invention, showing one preferred header and sloped-tube coil module construction.
Figure 5:
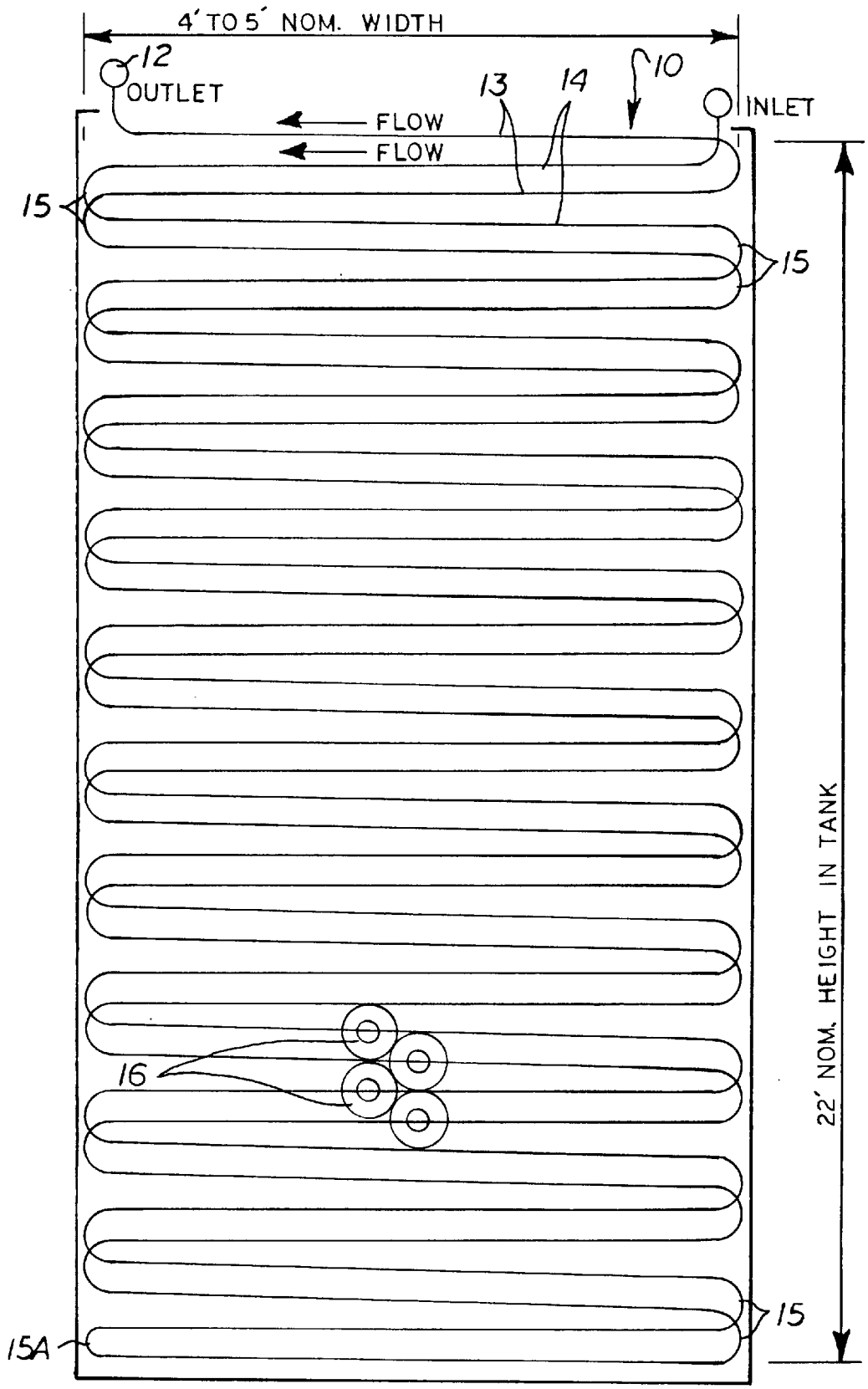
FIG. 5 is a schematic side elevation of the tall non-stack deep-tank ice-coil serpentine module in accordance with the present invention, representing the coil tubes (shown in single line) inside a water tank and illustrating the height to horizontal width relationship.

It should understood that the straight run sections 14 of the coil tube serpentines may be horizontal as illustrated in FIGS. 2 and 3 or, as illustrated in FIGS. 4 and 5, all straight runs of the serpentines may slope upward from the lower portion of the U-bends 15 at the lateral sides of the coils in a sloped or "near-horizontal" configuration.

As shown schematically in FIGS. 3 and 5, as cold coolant mixtures (ethylene glycol/water mixtures) are circulated through the coils, the water in the tank freezes and forms ice cylinders 16 on the coil tubes 13. As shown in FIG. 3, with the present coil configuration, the diameter of the ice cylinders 16 which form on the down-serpentines (supply side) vary slightly from a larger diameter at the upper portion to a smaller diameter at the lower portion, and further reduce in diameter 16A on the up-serpentines (return side). The adjacent ice cylinders 16 are nested in a pattern of "least void space", whether the pattern is at the top or bottom (or anywhere in between) of the coil. "Least void space" is defined as the volumetric area into which ice does not form, but is retained as water. As shown in FIG. 5, while near perfect nesting of the ice cylinders may occur at the vertical centerline of the coil, more void space will occur in areas near the sides due to the tube slope.

It should be noted that "least void space" is the most desirable ice cylinder pattern that will occur at very energy efficient refrigeration evaporator temperatures, where the coldest glycol temperature may be a low as about 22 degrees F. System designers may choose to use colder evaporator temperatures which can ultimately freeze ice into most of the "void spaces", nearly freezing the tank solid, in order to achieve a greater amount of ice in the storage tank, but if this is done, the compressor horsepower requirements will rise very substantially.

FIG. 4 shows the top and bottom portions of the tall non-stack deep-tank ice-coil serpentine module 10 in greater detail. The framing 17 and tubular supports 18 near the end of each coil are conventional in the art. FIG. 4 shows a preferred embodiment of a tubular header and "sloped-tube" coil module construction. In a typical module having a width of from about 4' to about 5', the slope, relative to horizontal, is about ½" per pass (pass being defined as the straight run portion of each tube). As indicated by arrows, this sloped or "near horizontal" coil configuration greatly facilitates air being pushed out ahead of the glycol/water being filled from the inlet header 11, without trapping air. This is a significant feature that prevents operational problems in the pumping systems and avoids losing ice building capability adjacent to air pockets.

FIG. 4 also shows the typical position of the surface of the water in the tank T during periods of fully-ice built and fully melted conditions relative to the position of the headers 11 and 12 at those periods of time. When the ice is fully melted, the waterline is below the headers 11 and 12, and when the system is fully charged with ice, the waterline is just slightly above the headers. Thus, all manifold and header joints are above, or just below the water surface of the tank, easily accessible for maintenance or assembly, and only the tubes are submerged for ice-building purposes. In fact, even when the coil headers are just below the water surface during the time that the ice is fully built on the coil tubes, they will be above the surface of the water when the ice is fully thawed (due to the lesser density of ice in comparison to water), and easily visible for leak-checking or leak repair, so that it becomes unnecessary to drain the tank to search for and repair leaks, as is required with the current state of the art of steel tubed ice-on-coil thermal storage systems.

Figure 6:
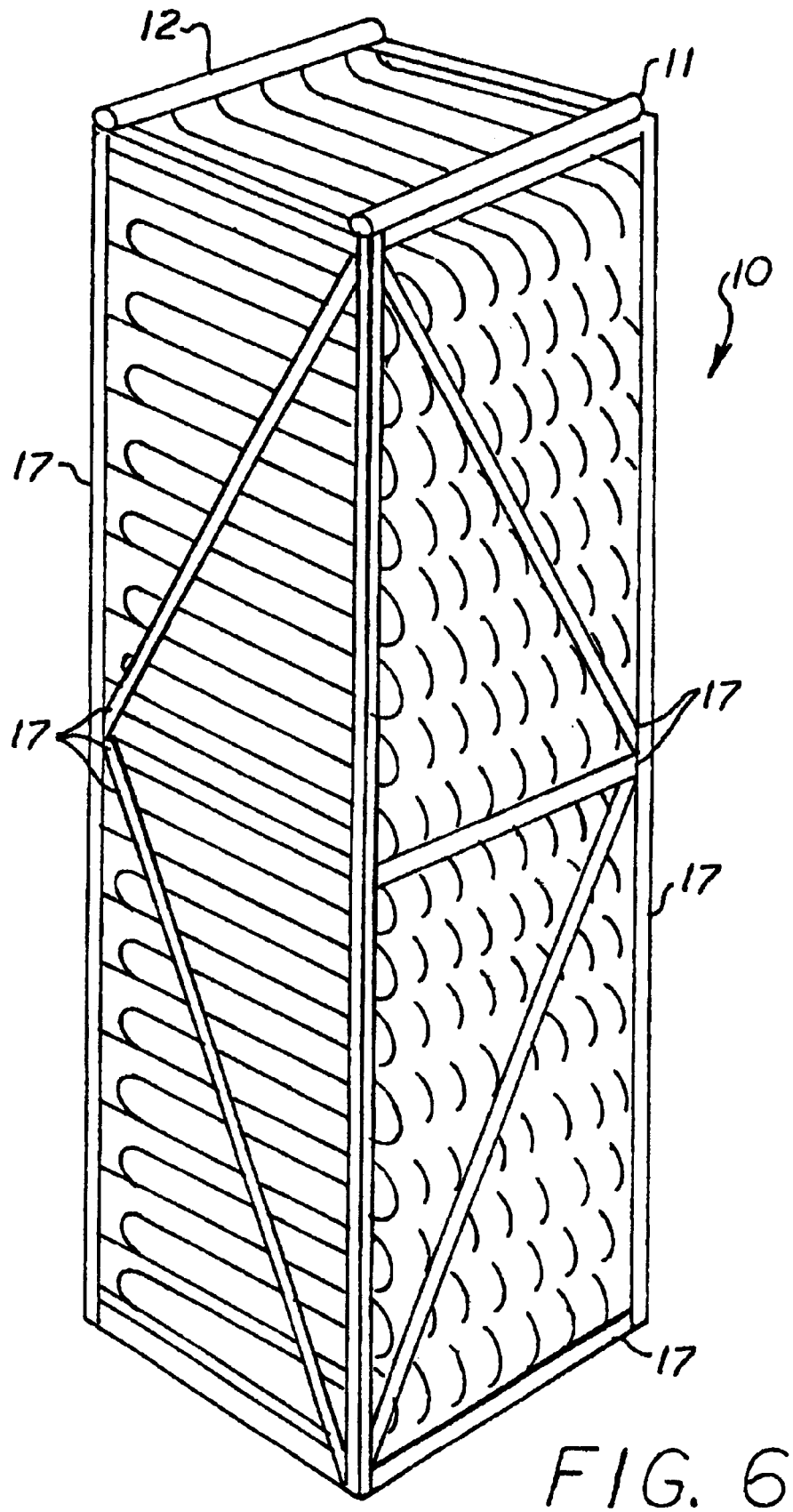
FIG. 6 is a schematic perspective view of a typical tall non-stack deep-tank ice-coil serpentine modular package in accordance with the present invention which allows handling and shipping (typically in the horizontal position) and the shape of the module as it is to be inserted into the deep tank (in the vertical position shown).

As shown in FIG. 5, the coil bundle or module 10 may be sized from about 22' up to about 30' in height to serve a very deep ice tank, with all header connections near or above the water surface. If galvanized tubes are used, the length of the galvanizing tank will determine the maximum height of the coil module (typically a 22' nominal module height). Alternate non-hot-dip galvanized materials or coatings may allow coils of greater height to be produced. FIG. 6 shows a typical tall non-stack deep-tank ice-coil serpentine module 10 supported by framing 17 and the shape of the module as it is to be inserted into the deep tank (in the vertical position shown). The modules 10 may also be transported on a flat bed truck in a horizontal stacked position. A typical coil module can be shipped on its side, with up to four modules per 25' truck bed, or up to eight modules per special 50' truck bed.

In a preferred embodiment, using 1.05" O.D. tubes, the U-bends are about 3.5" diameter to allow an ice thickness of about 1.4". Tube circuit lengths up to about 1000' are practical for fluid flow and heat transfer at from about 2.5 ft/sec to about 4.5 ft/sec tube velocity. Larger diameter tubes may be used for larger circuits to minimize pressure drop at other spacings.

The coil modules of the present invention may be sized for much larger volumetric usage than current and prior art units, which are historically about 5' wide, 7' high, and 20' long for a total volume of about 700 cubic feet. The coil modules of the present invention can be galvanized in most commercial galvanizing tanks when only about 5' wide, 25' high, and 6' long, for a total volume of about 750 cubic feet. The coil modules of the present invention may also be enlarged to about 7' long to achieve a volume of about 875 cubic feet, and in some areas smaller width modules can be galvanized at longer lengths.

Since all manifolds and interconnecting piping are above the ice tank waterline, the modules can be installed more closely together to obtain a much more efficient use of space in the total system, or to minimize required plan area.

Figure 7:
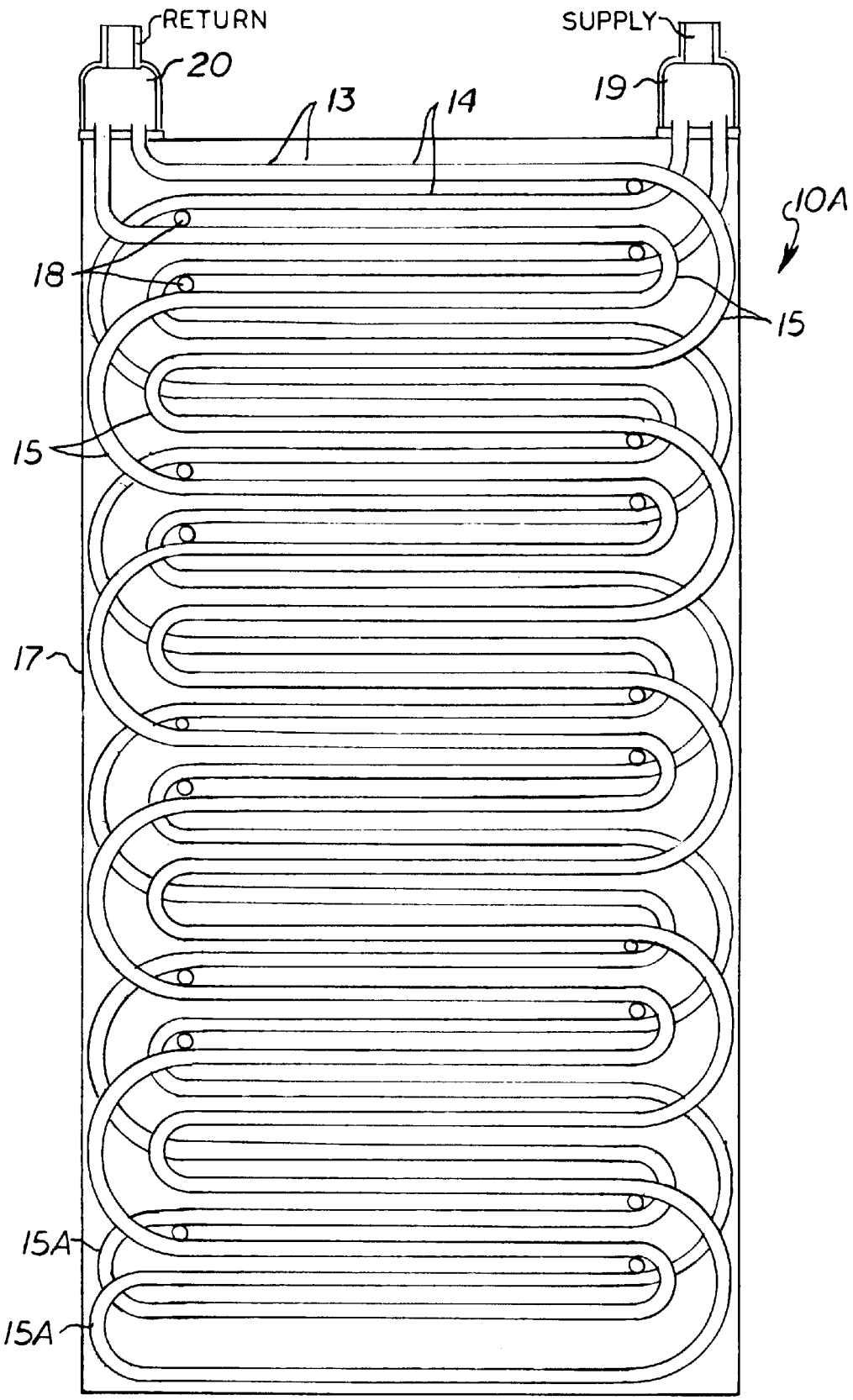
FIG. 7 is a schematic side elevation of a typical "double-serpentine" embodiment of the tall non-stack ice-coil module and showing a header of two-rows being used for both an inlet and outlet header, the horizontal tubes may be straight, as shown, or sloped.

FIG. 7 is a schematic side elevation of a typical embodiment of a "double-serpentine" non-stack ice-coil module 10A which may be used alternatively to the embodiments of FIGS. 2–6. The "double-serpentine" module 10A having two-row headers 19 and 20, each used for both an inlet and outlet header, and each feeding two nested down-serpentines and returning two nested up-serpentines to achieve the same coil height as the previously described embodiments, but doing so with the use of coil tubes of only half as long. Multiples of these two rows are connected in parallel to form the module. As with the previous embodiments, the coil serpentines have straight run sections 14 with U-bends 15 at each end and the straight run sections may be horizontal or slightly sloped.

FIG. 8 is a schematic illustration of a tube bending layout pattern to effect the sloped or near-horizontal coil configurations described above, but providing an option to the compound U-bend 15A of FIG. 7, which will correctly position the adjacent row of serpentine and produce a downward U-bend at an offset position to effect correct two-row serpentine positioning. The pipe or tubing is bent to form two approximately 20' sections 21A and 21B of sloped serpentines separated by a wider straight mid section 22. To form adjacent rows of serpentines, the tubular configuration is bent about the point indicated by the dashed line B and the second 20' serpentine section 21B is folded back on the first section 21A. This produces a downward U-bend at the lowest point of the folded 40' serpentine. In the illustrated example, a nominal 630' tube is formed to make 5' straight run sections 14 angularly sloped to each U-bend 15. Assuming a tube height spacing of about 4" at the centerline, there are 3 tubes per foot of height. (Thus, 5'×3 per foot of height×21' coil serpentine height×2 serpentines =630'). Optionally, a welded U-bend may be used to reduce the complexity of forming the compound bends.

FIG. 9 shows, in cross section, an alternate embodiment of an inlet and outlet "box" header 23 that allows all piping manifolds in the field to be on one side at the top of the coil module. The "box" header has a longitudinal bottom plate 24 with holes therethrough through which the upper ends of the tubes 13 are secured. An inverted generally U-shaped longitudinal cover 25 enclosed at each end is secured over the bottom plate 24. A vertical partition plate 26 inside the cover 25 divides the upper ends of the supply coils from the upper ends of the return coils and segregates the inlet flow from the outlet flow. The supply manifold is connected in fluid communication to one side of the cover 25 and the return manifold is connected in fluid communication to the other side.

FIG. 10 shows, in cross section, a second alternate embodiment of a partitioned inlet and outlet "box" header 27 having a center partition plate 26. In this embodiment, a longitudinal box-like cover 28 enclosed at each end is secured to the bottom plate 24. A vertical partition plate 26 inside the cover 25 divides the upper ends of the supply coils from the upper ends of the return coils and segregates the inlet flow from the outlet flow. The cover 28 has an open top end with a pair of longitudinal laterally opposed flanges 29. A removable cover plate 31 is removably mounted over the open top end by bolts 30. The cover plate 31 can be removed for the purpose of accessing each tube inlet or outlet or for servicing or blocking the tubes in the event of a tube leak at the lower tube extremities.

FIG. 11 shows, in cross section, a modification of the tubular inlet header 11 and outlet header 12, wherein the upper ends of the tubes 13 are provided with up-bends 13A below the headers to permit operation without submerging the header, or to avoid local traps of half-tubes, as may occur on the tubular headers shown in FIG. 4. However, it should be understood that the use of tubes having such traps is not considered to be a significant problem.

Figure 12:
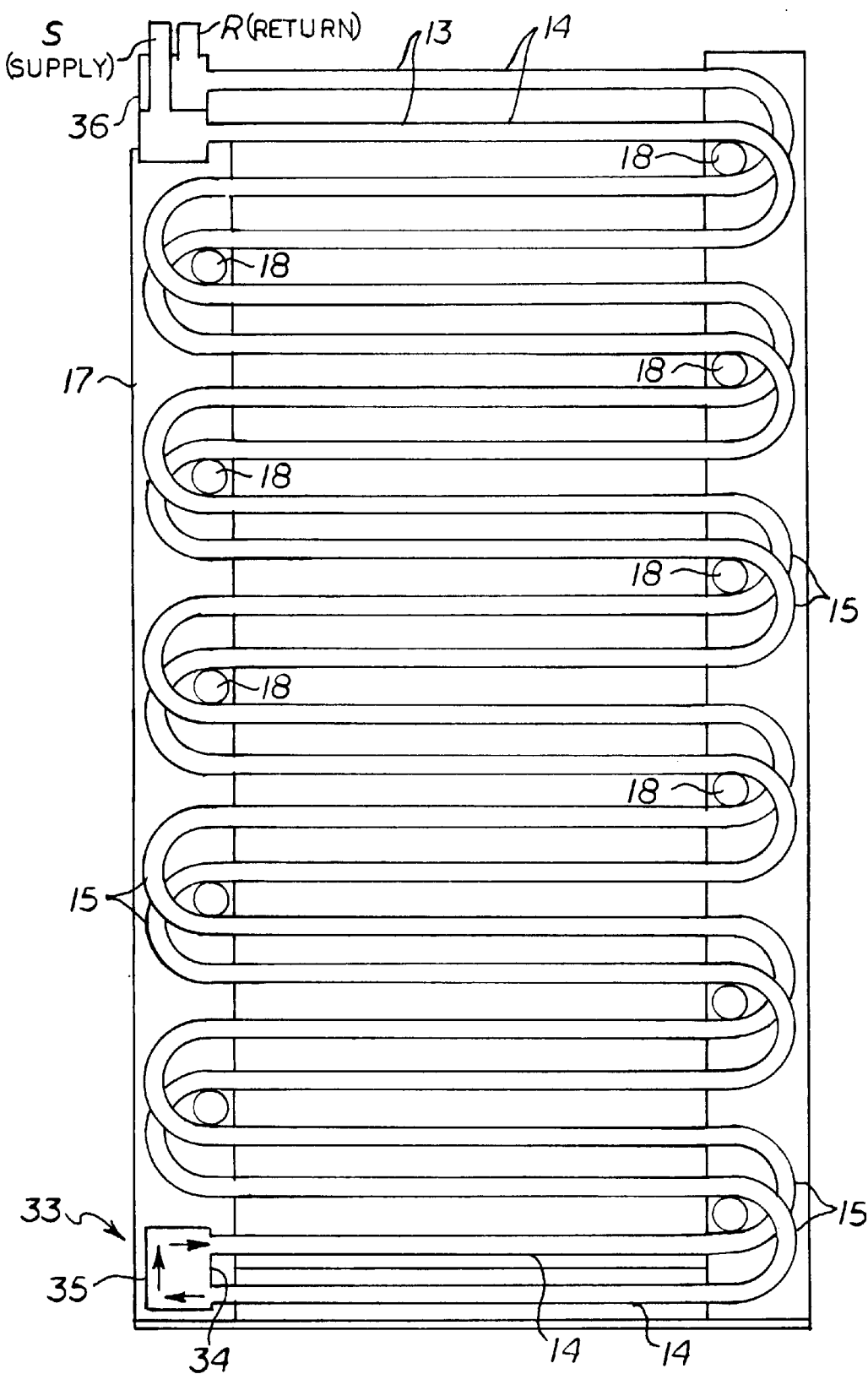
FIG. 12 is a schematic side elevation of a modification of the tall non-stack deep-tank ice-coil serpentine module having a lower "box" header and an upper "box" header in accordance with the present invention.
Figure 13:
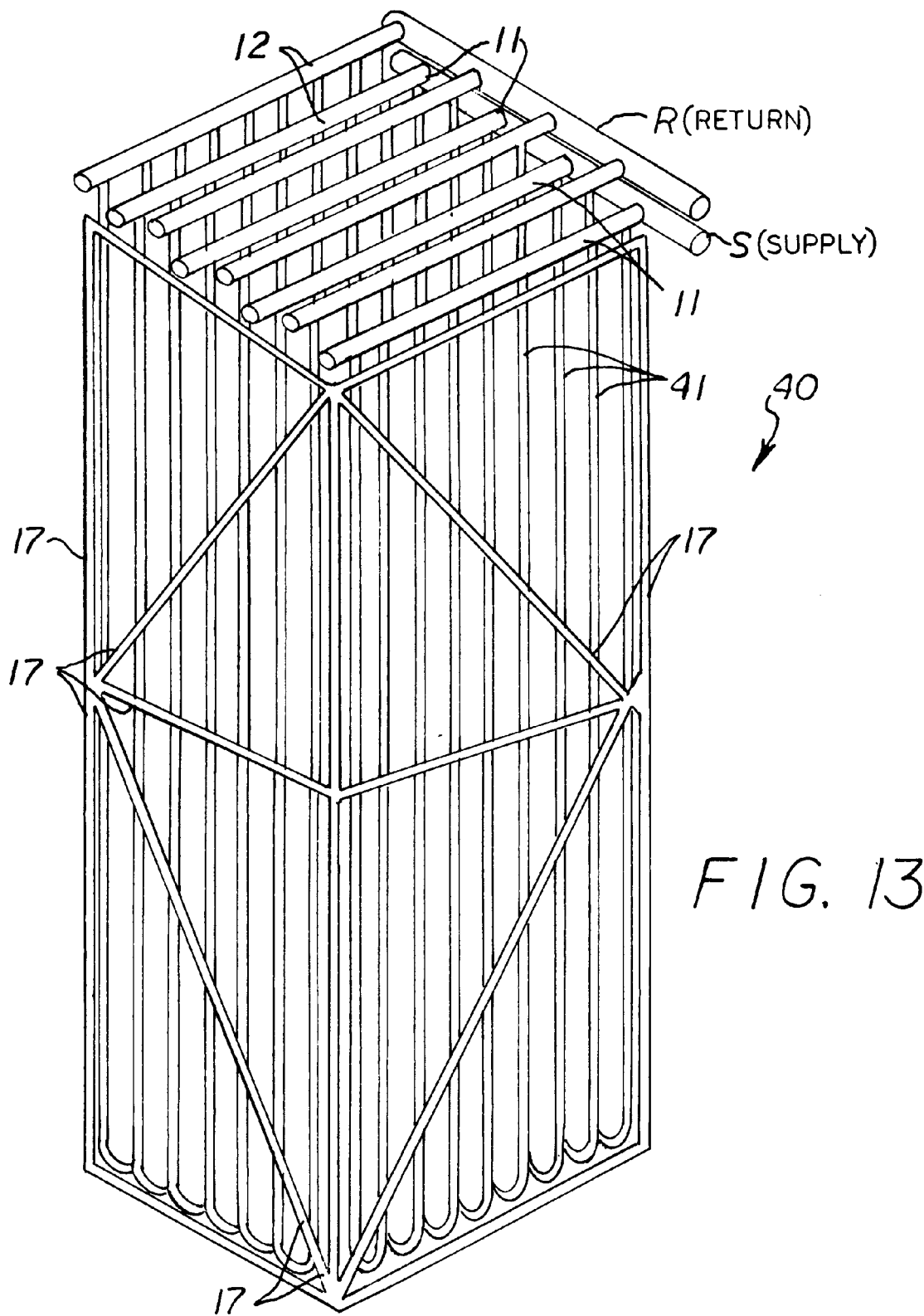
FIG. 13 is a schematic perspective view of a typical very deep non-stack ice-coil "hairpin" module in accordance with the present invention which utilizes vertical tubes formed into individual hairpin configurations between adjacent rows, clustered into modules and supported by framing.

FIG. 12 illustrates a modification of the serpentine coil configuration wherein the lowermost straight run sections 14 of the supply and return coils are commonly joined by a lower box header 33. The lower box header 33 has a longitudinal side plate 34 with a lower row of longitudinally spaced holes through which the open ends of the lowermost straight run 14 of the supply coil tubes are secured and an upper row of longitudinally spaced holes through which the open ends of lowermost straight run of the return coil tubes are secured. A longitudinal, generally U-shaped cover 35 enclosed at each end is secured over the side plate 34. The lower header 33 allows all liquid and vapor coming from the bottom row of supply tubes to reverse flow to the second row of tubes from the bottom (return tubes). As indicated by the arrows, any air entrained in the down-coming supply tube liquid streams will enter the lower box header 33 and be pushed upward into the return tubes and thence upward and outward of the coil assembly. A partitioned upper header 36 is shown at the top of the coil module which segregates the inlet flow from the outlet flow. However, it should be understood that the lower header 33 may be used with any of the previously described supply and return headers. It should also be understood that the lower header 33 may be used with coils having a horizontal straight run section or a near-horizontal sloped straight run section.

Figure 14:
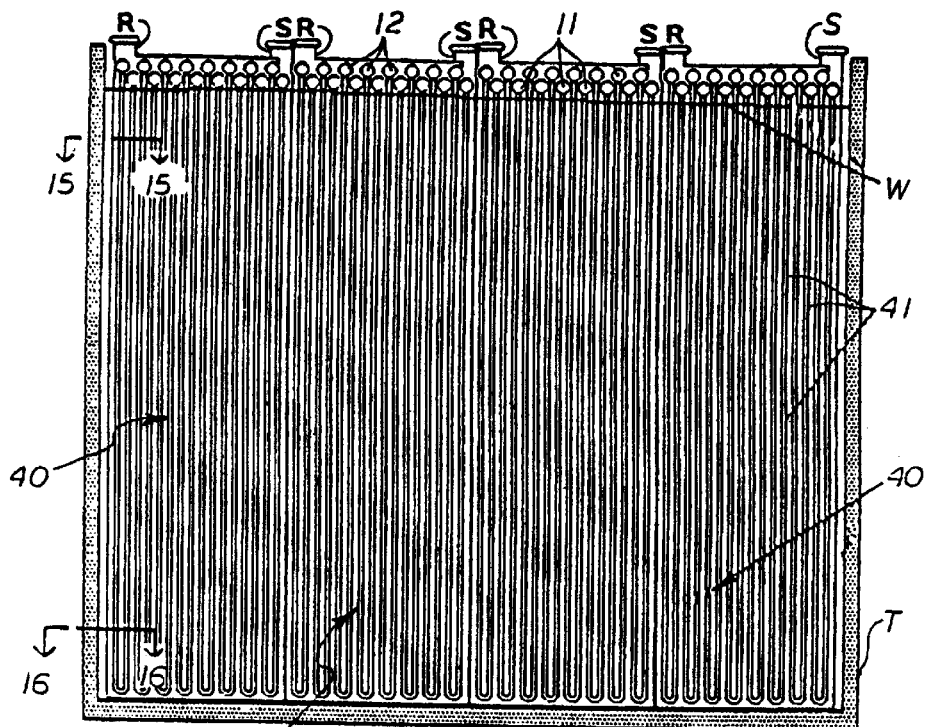
FIG. 14 is a schematic side elevation of a multi-modular very-deep hairpin system using the coil system of FIG. 13, showing the modules in a tank with the headers and manifolds above the waterline when the ice has fully melted.

Referring now to FIGS. 13 through 17, there is shown a deep non-stack ice-on-coil "hairpin" module 40 in accordance with the present invention which utilizes only vertical tubes 41 formed into adjacent individual elongate U-shaped hairpin configurations, clustered into modules and supported by framing 17 and held in place by spacer elements (not shown) This embodiment may use tubes 41 formed of galvanized steel, seamless tubing, or metallic alternatives to galvanized steel, for example, aluminum, copper, or plastic tubing. Extruded aluminum may also be used and rolled into plate headers or header tubes and provided with plugs or removable covers for access. This embodiment can serve in ice tanks T up to 40' deep with no coil stacking. As best seen in FIG. 14, in this embodiment, the supply headers 11 and return headers 12 are also disposed at the upper ends of the vertical tubes 41 and there are no header or pipe welds below the waterline W. The headers and manifolds may be submerged as the freezing process proceeds, and fully exposed as the ice is fully melted.

Figures 15, 16, 17:
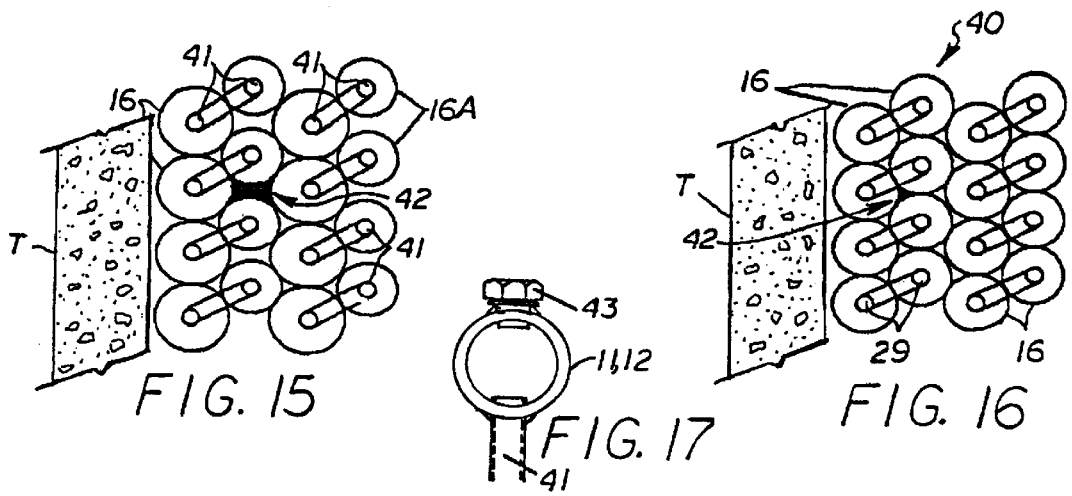
FIG. 15 is a schematic transverse cross section taken along line 15—15 of FIG. 14, showing the adjacent ice cylinder and void space pattern between adjacent tubes at the upper portion of the rows of the hairpin tubes.
FIG. 16 is a schematic transverse cross section taken along line 16—16 of FIG. 14, showing the adjacent ice cylinder and void space pattern between adjacent tubes at the lower portion of the rows of the hairpin tubes.
FIG. 17 is a cross section through a tubular coil header of the hairpin tube system showing a removable plug that allows access to the inside of the tubes at the inlet and outlet headers for servicing or inspecting the interior of the coil tubes.

As shown in FIGS. 15 and 16, with the "hairpin" coil configuration 40, the diameter of the ice cylinders 16 which form on the down-leg of the coil (supply side) vary slightly from a larger diameter at the upper portion to a smaller diameter at the lower portion, and further reduce in diameter 16A on the up-leg of the coil (return side). The adjacent ice cylinders 16 are nested in a pattern of least void space 42 (defined as the volumetric area into which ice does not form, but is retained as water), whether the pattern is at the top or bottom (or anywhere in between) of the coil. As shown in FIG. 16, near perfect nesting of the ice cylinders 16 occurs at the lower portion of the coil. FIG. 17 shows, in cross section, a tubular coil header 11, 12 of the hairpin tube system having a removable plug 43 installed through the upper facing side of its side wall that allows access to the inside of the tubes 41 at the inlet and outlet headers for servicing or inspecting the interior of the coil tubes.

Figure 18:
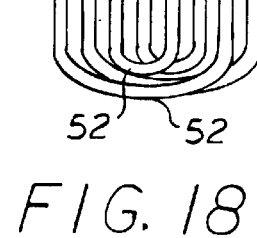
FIG. 18 is a schematic side elevation of a modification of the hairpin module which utilizes vertical tubes formed into individual hairpin configurations with nested and laterally wider U-bends and the bottom of the modules and removable-plug box headers for tube-end access.
Figure 19:
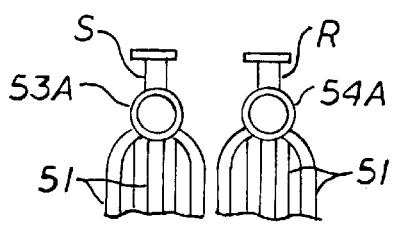
FIG. 19 is a schematic cross section through the upper end of the hairpin module showing alternate tubular pipe headers with multiple-tube row connections to the headers.

Referring now to FIG. 18, there is shown, schematically, a modification of the very deep non-stack ice-coil hairpin module 50 which also utilizes only vertical tubes 51 of seamless tubing or metallic alternatives to galvanized steel that are formed into individual hairpin configurations with nested and laterally wider U-bends 52 at the bottom and a supply header 53 and return header 54 at the upper end of the tubes. This embodiment also has no header or pipe welds below the waterline and can serve ice tanks up to about 40' in height with no coil stacking. A box type supply header 53 and return header 54 with removable plugs 55 is shown in FIG. 18. Supply pipes S and return pipes R may be located on the side or end of the box headers 53 and 54 to permit access to tubes via removable header cover plates 56. FIG. 19 shows an alternate tubular supply header 53A and return header 54A with multiple-tube row connections to the headers which may be used in the system of FIG. 18.

Figure 20:
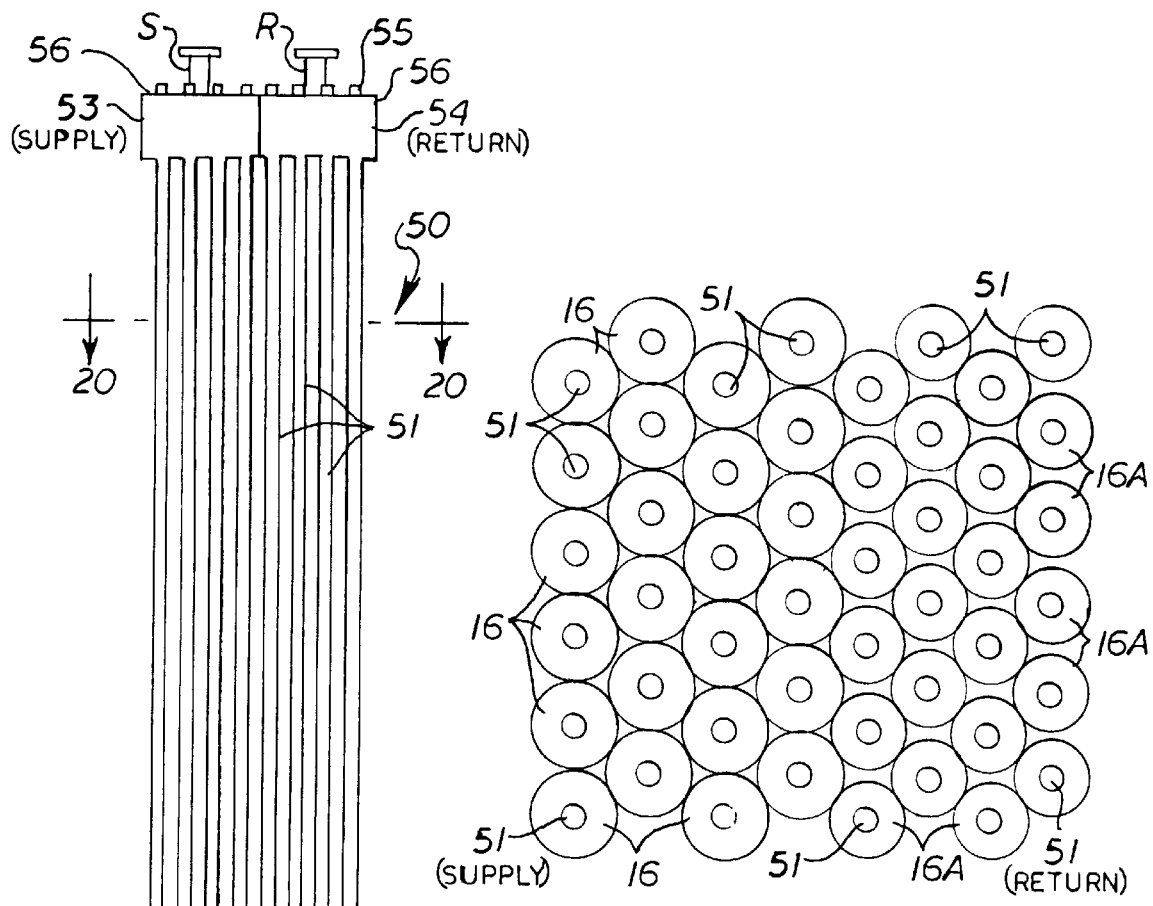
FIG. 20 is a schematic transverse cross section taken along line 20—20 of FIG. 18, showing the adjacent ice cylinder and void space pattern between adjacent tubes at the upper portion of the rows of the U-shaped tubes.

As shown in FIG. 20, the diameter of the ice cylinders 16 which form on the down-leg (supply side) of the coil on one side (left-hand side as seen in FIG. 20) of the module vary slightly from a larger diameter at the upper portion to a smaller diameter at the lower portion, and further reduce in diameter 16A on the up-leg (return side) of the coil (right-hand side). The adjacent ice cylinders 16 are nested in a pattern of least void space, whether the pattern is at the top or bottom (or anywhere in between) of the coil. Near perfect nesting of the ice cylinders occurs at the lower portion of the coil.

In the embodiment of FIG. 18, the U-bends 52 at the bottom may range from about 6.91" diameter for the shortest bend to about 22.39" for the longest bend, based on an average ice thickness of 1.4", with up to 0.2" thicker ice at the inlet, and up to 0.2" thinner ice at the outlet of the tube circuit. This embodiment may range in height from about 24' for a galvanizing tank limitation to about 40' for a truck bed shipping limitation. The modules may be stacked to a height of about 8' or about 12' wide for shipping.

Figure 21:
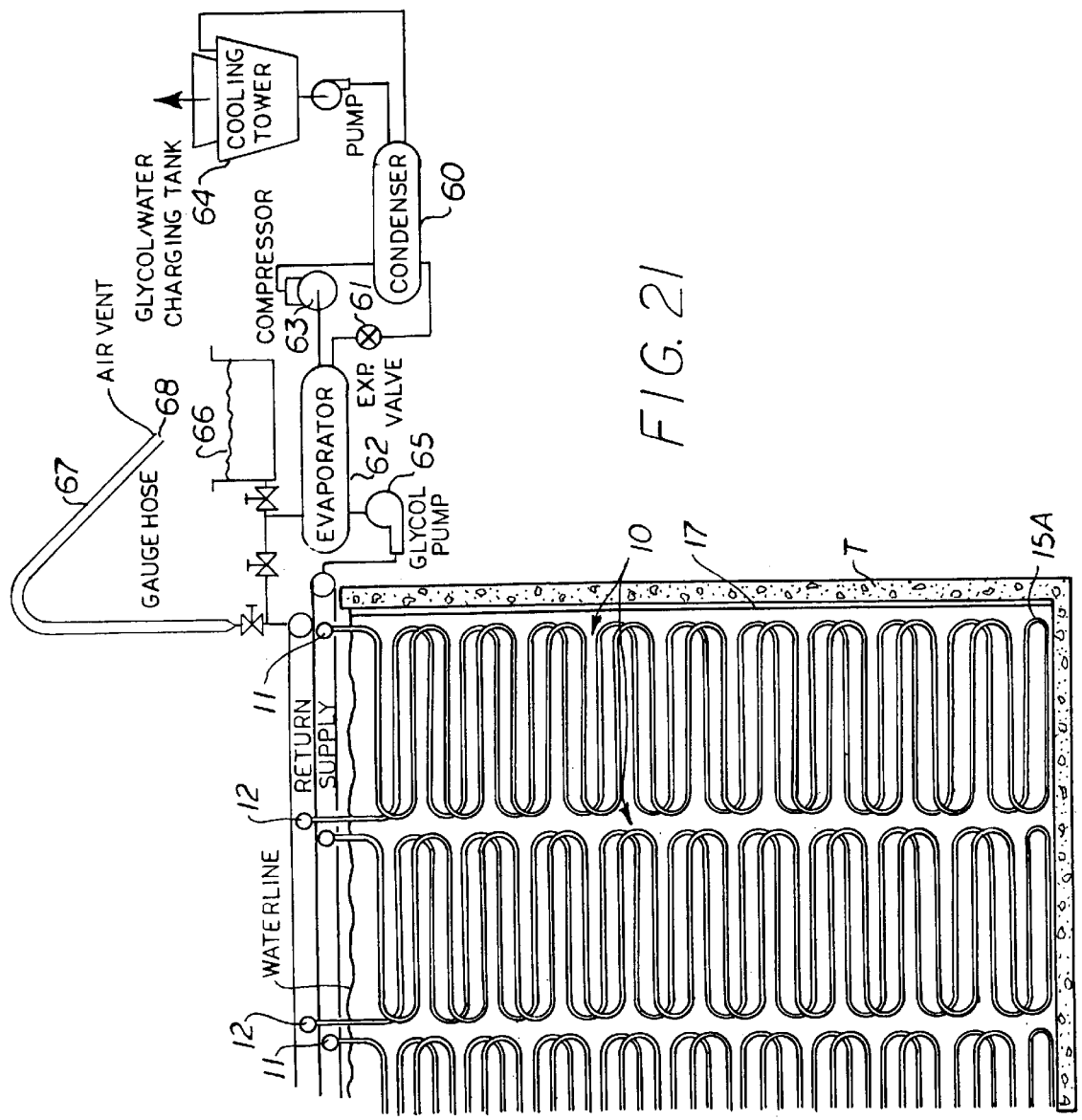
FIG. 21 is a schematic side elevation of a portion of a multi-modular tall non-stack deep-tank ice-coil serpentine system illustrating a method of charging a complete system with glycol-water while simultaneously removing air without encountering entrapment of air.

FIG. 21 is a schematic side elevation of a portion of a multi-modular tall non-stack deep-tank ice-coil serpentine system utilizing the coil configurations of FIGS. 2–6 illustrating a method of charging a complete system with glycol-water while simultaneously removing air without encountering entrapment of air.

FIG. 22 is a schematic side elevation of a portion of a multi-modular tall non-stack deep-tank ice-coil serpentine system utilizing the coil configurations of FIGS. 2–6 illustrating a complete piping system which allows (by valving options, usually automatically controlled by sensors and motors) the system to be used as ice melting or ice-building during various periods of the day or week to allow minimizing use of electric power during periods of heavy power demand (typically melting ice in the afternoon periods), and building ice in the remaining time period.

In FIGS. 21 and 22, a refrigerant, such as "refrigerant 22" (monochlorodifluoromethane), commonly used throughout the industry and considered an HCFC type refrigerant, is piped as follows. The liquid refrigerant is condensed in a condenser 60, passes to an expansion valve 61 where it is expanded, lowering the pressure and vaporizing the refrigerant in an evaporator 62 where it absorbs heat energy from the warmed ethylene-glycol solution by heat transfer through the tubular heat exchanger walls within the evaporator, and becomes fully vaporized. The vaporized refrigerant (gas) now passes to a compressor 63 where the gas is pressurized to high pressure and flows to the condenser 60 where the gas is condensed back to a liquid by heat transfer through the tubular heat exchanger walls within the condenser, with the heat passing to a water circuit (within the condenser tubes) and pumped to a cooling tower 64 for heat rejection to the atmosphere.

The glycol-water mixture is pumped by pump 65 from the evaporator (inside tubes) to the supply manifolds above the ice tank T and then through the ice-coils 10 to return to the evaporator. FIG. 21 also shows a piping arrangement for charging the glycol-water from a glycol-water charging tank 66 into the system while removing air from the return manifold via a gauge hose 67 with an air vent 68. As shown in FIG. 22, once the unit is fully charged, the glycol piping is circuited through air handler coils 69 for normal operation of the total system.

While this invention has been described fully and completely with special emphasis upon preferred embodiments, it should be understood that, within the scope of the appended claims, the invention may be practiced otherwise than as specifically described herein.

I claim:

1. A thermal storage coil apparatus for installation in an ice-on-coil thermal storage tank for transporting a refrigerant through said tank and on which ice cylinders are formed from water in the tank, comprising:

a serpentine tubular coil having an inlet end, an outlet end, and vertically spaced rows of elongate straight run sections adjoined by U-shaped curved portions at each end of each of said straight run sections, said coil having a height in a vertical direction greater than its width and length in a horizontal direction; and a supply header connected with said inlet end for providing refrigerant to said coil and a return header connected at said outlet end for withdrawing refrigerant from said coil, wherein said coil height in a vertical direction is at least twice its width in a horizontal direction and said supply header and said return header are disposed at an upper end of said coil.

2. The thermal storage coil according to claim 1, wherein said coil is formed of a single length of tubing bent to form said elongate straight run sections and U-shaped curved portions.

3. The thermal storage coil according to claim 1, wherein said coil elongate straight run sections between said U-shaped portions are disposed at an angle relative to a horizontal axis sufficient to facilitate removal of air therefrom during filling said coil with the refrigerant.

4. A thermal storage coil apparatus for installation in an ice-on-coil thermal storage tank for transporting a refrigerant through said tank and on which ice cylinders are formed from water in the tank, comprising:

a serpentine tubular coil having an inlet end, an outlet end, and vertically spaced rows of elongate straight run sections adjoined by U-shaped curved portions at each end of each of said straight run sections, said coil having a height in a vertical direction greater than its width and length in a horizontal direction;

a supply header connected with said inlet end for providing refrigerant to said coil and a return header connected at said outlet end for withdrawing refrigerant from said coil, wherein said coil has a supply section formed of a first plurality of rows of said elongate straight run sections and U-shaped curved portions extending downwardly from said inlet end with a U-shaped bend at a lower-most end thereof; and a return section extending upwardly from said U-shaped bend formed of a second plurality of rows of said elongate straight run sections and U-shaped curved portions and terminating at said outlet end;

said supply section and said return section disposed in parallel spaced apart vertical planes with said U-shaped bend at said lowermost end extending between said parallel spaced vertical planes.

5. The thermal storage coil according to claim 4, wherein said rows of elongate straight run sections of said supply section and said return section are offset and spaced apart a distance to form ice cylinders of predetermined diameter on adjacent straight run sections that are nested in a pattern to maximize ice build and minimize ice void areas.

6. The thermal storage coil according to claim 4, wherein said coil has a pair of said supply sections disposed in a first vertical plane and a pair of said return sections disposed in a second vertical plane parallel to said first vertical plane;

each of said supply sections having an inlet end connected with said supply header and a U-shaped bend at a lowermost end;

each of said return sections extending upwardly from a respective said U-shaped compound bend and having an outlet end connected with said return header; and each said U-shaped bend at said lowermost end extending between said first and second parallel spaced vertical planes.

7. The thermal storage coil according to claim 4, wherein said U-shaped bend at said lowermost end is a compound U-shaped bend curved about a horizontal axis and a vertical axis.

8. The thermal storage coil according to claim 4, wherein said supply section and said return section are both formed of a single length of tubing bent to form said elongate straight run sections, said U-shaped curved portions, and said U-shaped bend at said lowermost portion.

9. A thermal storage coil apparatus for installation in an ice-on-coil thermal storage tank for transporting a refrigerant through said tank and on which ice cylinders are formed from water in the tank, comprising:

a serpentine tubular coil having an inlet end, an outlet end, and vertically spaced rows of elongate straight run sections adjoined by U-shaped curved portions at each end of each of said straight run sections, said coil having a height in a vertical direction greater than its width and length in a horizontal direction;

a supply header connected with said inlet end for providing refrigerant to said coil and a return header connected at said outlet end for withdrawing refrigerant from said coil; and an enclosed box-like lower header having an inner chamber; and said coil has a supply section formed of a first plurality of rows of said elongate straight run sections and U-shaped curved portions extending downwardly from said inlet end with a lowermost straight run section of said supply section having an open end in fluid communication with a lower portion of said lower header inner chamber;

said coil has a return section formed of a second plurality of rows of said elongate straight run sections and U-shaped curved portions with a lowermost straight run section of said return section having an open end in fluid communication with an upper portion of said lower header inner chamber, said return section extending upwardly from said lower header and terminating at said outlet end; and said supply section and said return section disposed in parallel spaced apart vertical planes with said lower header extending between said parallel spaced vertical planes, wherein said supply section and said return section are commonly joined with said inner chamber and said refrigerant and entrained fluids are conducted downwardly from said supply header through said coil supply section into said inner chamber and are transported upwardly through said coil return section and outwardly through said return header.

10. A thermal storage coil apparatus for installation in an ice-on-coil thermal storage tank for transporting a refrigerant through said tank and on which ice cylinders are formed from water in the tank, comprising:

a tubular coil formed of a plurality of vertical elongate U-shaped tubular members each having a straight supply leg with an inlet end at an upper end and a parallel laterally spaced return leg with an outlet end at an upper end, each of said supply and return legs adjoined by a U-shaped curved portion at a bottom end thereof and said coil having a height in a vertical direction greater than its width and length in a horizontal direction; and a supply header connected with said inlet ends for providing refrigerant to said coil and a return header connected with said outlet ends for withdrawing refrigerant from said coil, wherein said coil height in a vertical direction is at least twice its width in a horizontal direction and said supply header and said return header are disposed at an upper end of said coil.

11. The thermal storage coil according to claim 10, wherein said supply legs and said return legs are offset and spaced apart a distance to form ice cylinders of predetermined diameter on adjacent legs that are nested in a pattern to maximize ice build and minimize ice void areas.

12. A thermal storage coil apparatus for installation in an ice-on-coil thermal storage tank for transporting a refrigerant through said tank and on which ice cylinders are formed from water in the tank, comprising:

a tubular coil formed of a plurality of vertical elongate U-shaped tubular members each having a straight supply leg with an inlet end at an upper end and a parallel laterally spaced return leg with an outlet end at an upper end, each of said supply and return legs adjoined by a U-shaped curved portion at a bottom end thereof and said coil having a height in a vertical direction greater than its width and length in a horizontal direction; and a supply header connected with said inlet ends for providing refrigerant to said coil, and a return header connected with said outlet ends for withdrawing refrigerant from said coil, wherein said plurality of vertical elongate U-shaped tubular members comprise an outer U-shaped tubular member having a straight supply leg with an inlet end at an upper end and a parallel laterally spaced straight return leg with an outlet end at an upper end adjoined by a wide U-shaped curved portion at a bottom end thereof; and a plurality of inner said vertical elongate U-shaped tubular members having successively smaller U-shaped curved portions at a bottom end thereof nested between said supply leg and return leg of said outer U-shaped tubular member with all of said supply legs and return legs in generally parallel laterally spaced relation.

13. The thermal storage coil according to claim 12, wherein said coil has a plurality of sets of said outer U-shaped tubular member and nested said inner U-shaped tubular members disposed in generally parallel spaced vertical planes; and each of said inlet ends connected with said supply header and each of said outlet ends connected with said return header.

14. The thermal storage coil according to claim 13, wherein
said straight supply legs and said return legs are offset and spaced apart a distance to form ice cylinders of predetermined diameter on adjacent legs that are nested in a pattern to maximize ice build and minimize ice void areas.

15. An ice-on-coil thermal storage system, comprising:
a generally rectangular ice tank suitable for containing water and having a bottom wall and opposed side walls;
a serpentine tubular coil having an inlet end, an outlet end, and vertically spaced rows of elongate straight run sections adjoined by U-shaped curved portions at each end of each of said straight run sections disposed in said tank for transporting a refrigerant through said tank and for forming ice cylinders thereon from water in said tank, said coil having a height in a vertical direction greater than its width and length in a horizontal direction; and
a supply header connected with said inlet end for providing refrigerant to said coil and a return header connected at said outlet end for withdrawing refrigerant from said coil, wherein said coil height in a vertical direction is at least twice its width in a horizontal direction and said supply header and said return header are disposed at an upper end of said coil.

16. The ice-on-coil thermal storage system according to claim 15, wherein
said coil straight run sections and U-shaped curved portions are submerged in water contained in said tank and said supply header and said return header are disposed above the water surface.

17. The ice-on-coil thermal storage system according to claim 15, wherein
said coil straight run sections and U-shaped curved portions are submerged in water contained in said tank and said supply header and said return header are just below the water surface.

18. The ice-on-coil thermal storage system according to claim 15, wherein
said supply header and said return header are disposed at a height relative to said tank bottom wall so as to be submerged just below the surface of water in said tank during periods of a fully ice-built condition and to be exposed above the water surface during periods of a fully ice-melted condition.

19. The ice-on-coil thermal storage system according to claim 15, wherein
said coil elongate straight run sections between said U-shaped portions are disposed at an angle relative to a horizontal axis sufficient to facilitate removal of air therefrom during filling said coil with the refrigerant.

20. An ice-on-coil thermal storage system, comprising:
a generally rectangular ice tank suitable for containing water and having a bottom wall and opposed side walls;
a serpentine tubular coil having an inlet end, an outlet end, and vertically spaced rows of elongate straight run sections adjoined by U-shaped curved portions at each end of each of said straight run sections disposed in said tank for transporting a refrigerant through said tank and for forming ice cylinders thereon from water in said tank said coil having a height in a vertical direction greater than its width and length in a horizontal direction; and a supply header connected with said inlet end for providing refrigerant to said coil and a return header connected at said outlet end for withdrawing refrigerant from said coil, wherein
said coil has a supply section formed of a first plurality of rows of said elongate straight run sections and U-shaped curved portions extending downwardly from said inlet end with a U-shaped bend at a lowermost end thereof; and
a return section extending upwardly from said U-shaped bend formed of a second plurality of rows of said elongate straight run sections and U-shaped curved portions and terminating at said outlet end;
said supply section and said return section disposed in parallel spaced apart vertical planes with said U-shaped bend at said lowermost end extending between said parallel spaced vertical planes.

21. The ice-on-coil thermal storage system according to claim 20, wherein
said rows of elongate straight run sections of said supply section and said return section are offset and spaced apart a distance to form ice cylinders of predetermined diameter on adjacent straight run sections that are nested in a pattern to maximize ice build and minimize ice void areas.

22. An ice-on-coil thermal storage system, comprising: a generally rectangular ice tank suitable for containing water and having a bottom wall and opposed side walls;
a tubular coil disposed in said tank for transporting a refrigerant through said tank and for forming ice cylinders thereon from water in said tank, said coil formed of a plurality of vertical elongate U-shaped tubular members each having a straight supply leg with an inlet end at an upper end and a parallel laterally spaced return leg with an outlet end at an upper end, each of said supply and return legs adjoined by a U-shaped curved portion at a bottom end thereof and said coil having a height in a vertical direction greater than its width and length in a horizontal direction; and
a supply header connected with said inlet ends for providing refrigerant to said coil and a return header connected with said outlet ends for withdrawing refrigerant from said coil, wherein said coil height in a vertical direction is at least twice its width in a horizontal direction and said supply header and said return header are disposed at an upper end of said coil.

23. The ice-on-coil thermal storage system according to claim 22, wherein
said supply header and said return header are dispposed at a height relative to said tank bottom wall so as to be submerged just below the surface of water in said tank during periods of a fully ice-built condition and to be exposed above the water surface during periods of a fully ice-melted condition.

24. The ice-on-coil thermal storage system according to claim 22, wherein
said supply legs and said return legs are offset and spaced apart a distance to form ice cylinders of predetermined diameter on adjacent legs that are nested in a pattern to maximize ice build and minimize ice void areas.

25. An ice-on-coil thermal storage system comprising:
a generally rectangular ice tank suitable for containing water and having a bottom wall and opposed side walls;
a tubular coil disposed in said tank for transporting a refrigerant through said tank and for forming ice cylinders thereon from water in said tank, said coil formed of a plurality of vertical elongate U-shaped tubular members each having a straight supply leg with an inlet end at an upper end and a parallel laterally spaced return log with an outlet end at an upper end, each of said supply and return legs adjoined by a U-shaped curved portion at a bottom end thereof and said coil having a height in a vertical direction greater than its width and length in a horizontal direction; and a supply header connected with said inlet ends for providing refrigerant to said coil and a return connected with said outlet ends for withdrawing refrigerant from said coil, wherein said plurality of vertical elongate U-shaped tubular members comprise an outer U-shaped tubular member having a straight supply leg with an inlet end at an upper end and a parallel laterally spaced straight return leg with an outlet end at an upper end adjoined by a wide U-shaped curved portion at a bottom end thereof; and a plurality of inner said vertical elongate U-shaped tubular members having successively smaller U-shaped curved portions at a bottom end thereof nested between said supply leg and retrun leg of said outer U-shaped tubular member with all of said supply legs and return legs in generally parallel laterally spaced relation.

26. The ice-on-coil thermal storage system according to claim 22, wherein said coil has a plurality of sets of said outer U-shaped tubular member and nested saidinner U-shaped tubular members disposed in generally parallel spaced vertical planes; and each of said inlet ends connected with said supply header and each of said outlet ends connected with said return header.

27. An ice-on-coil thermal storage system according to claim 26, wherein said straight supply legs and said return legs are offset and spaced apart a distance to form ice cylinders of predetermined diameter on adjacent legs that are nested in a pattern to maximize ice build and minimize ice void areas.

* * * * *